J. F. CRAWFORD.
MACHINE FOR MAKING RINGS.
APPLICATION FILED FEB. 20, 1919.

1,390,507.

Patented Sept. 13, 1921.
5 SHEETS—SHEET 1.

Witness:
Fred G. Dixon

Inventor:
John F. Crawford,
By James A. Walsh
Atty.

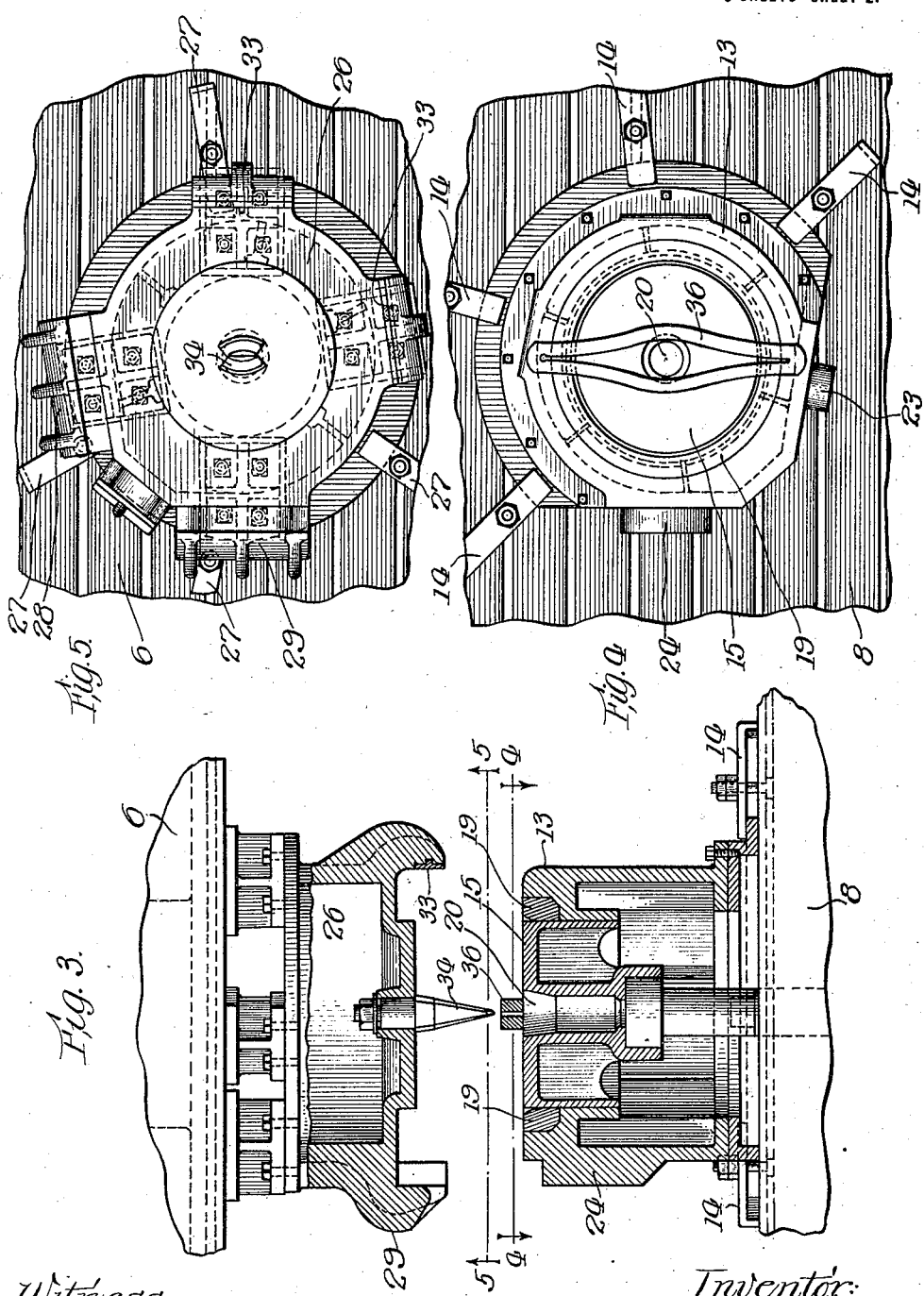

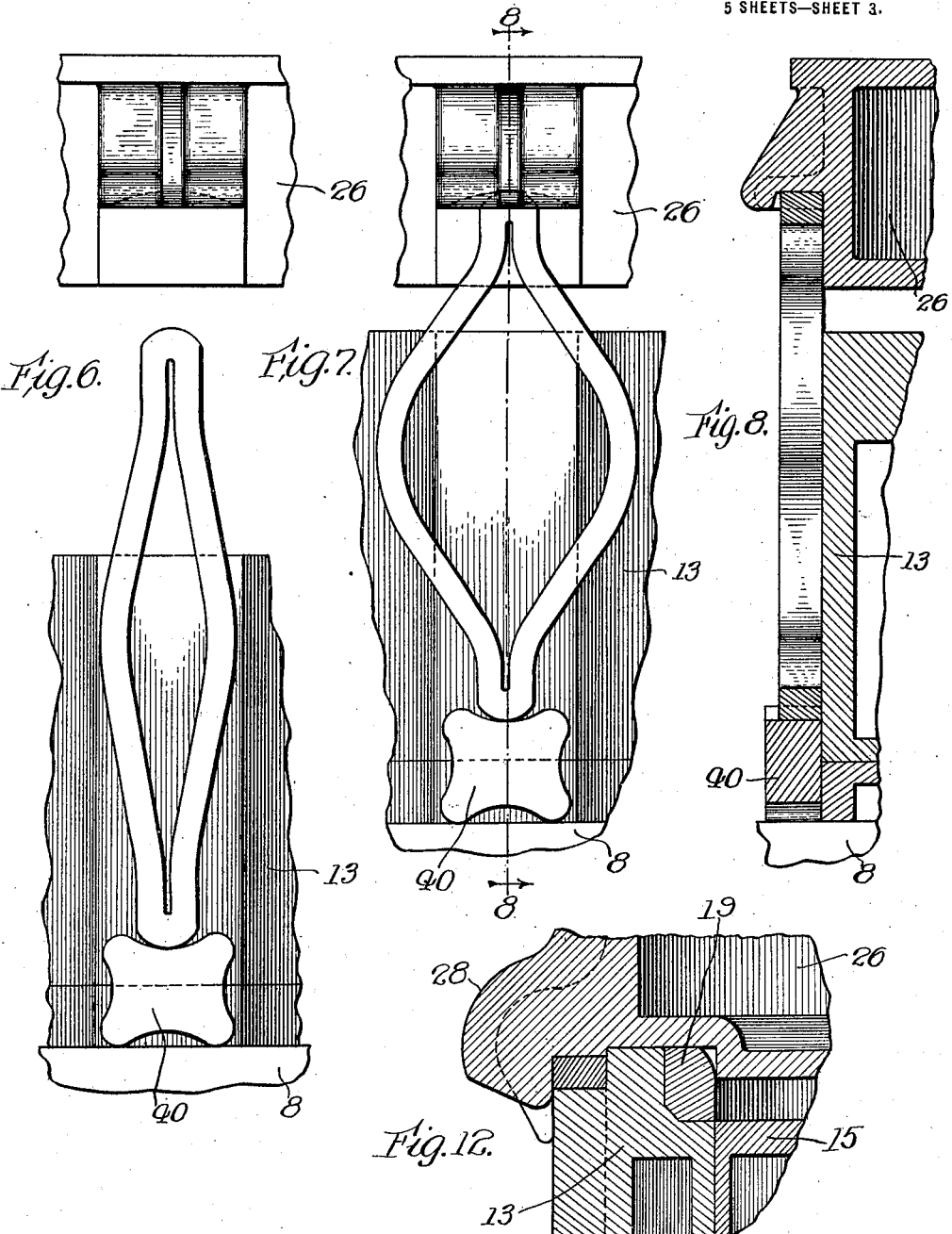

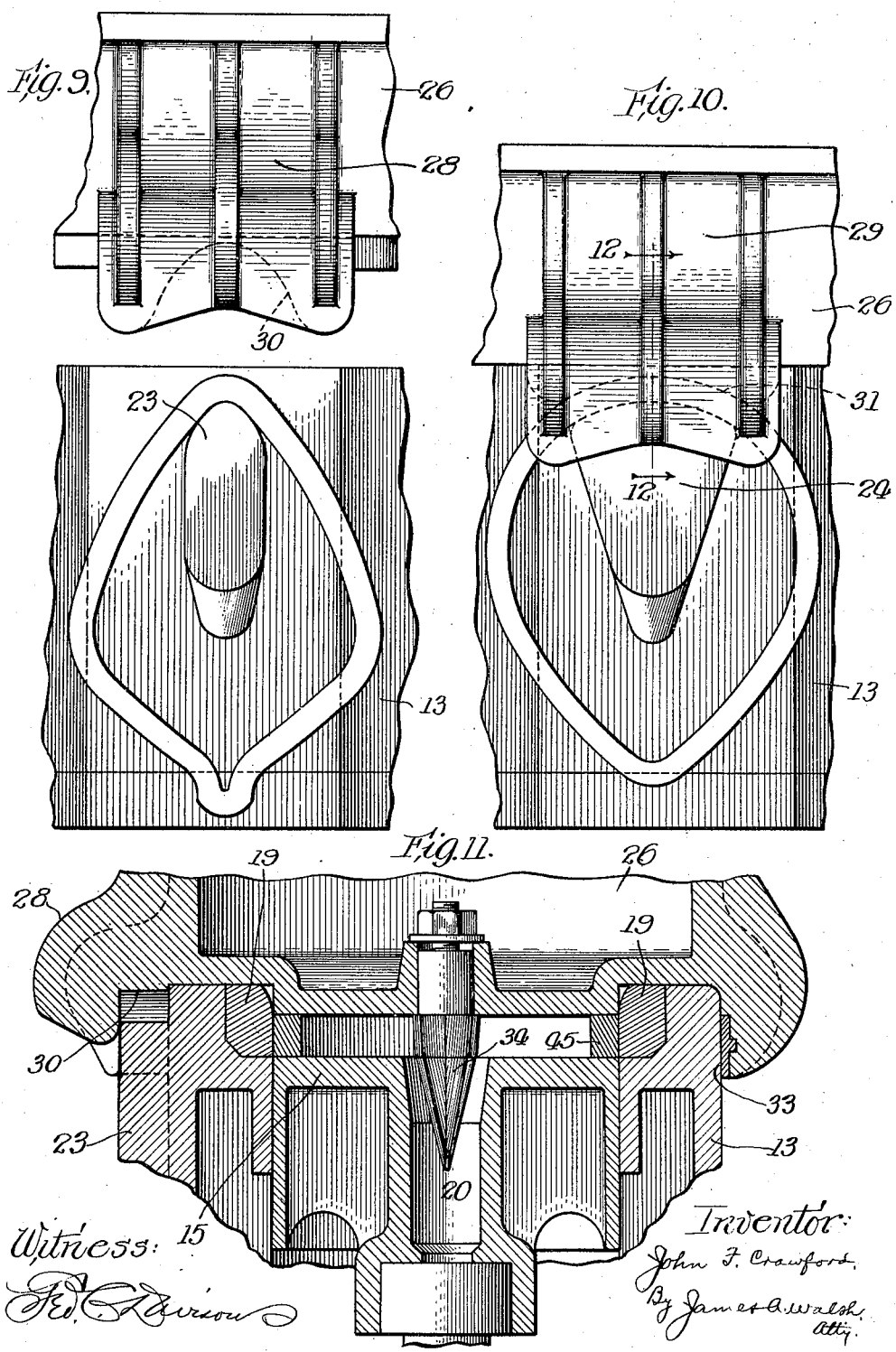

J. F. CRAWFORD.
MACHINE FOR MAKING RINGS.
APPLICATION FILED FEB. 20, 1919.

1,390,507.

Patented Sept. 13, 1921.
5 SHEETS—SHEET 5.

Witness:
Geo. C. Davison

Inventor:
John F. Crawford
By James A. Walsh,
Atty.

UNITED STATES PATENT OFFICE.

JOHN F. CRAWFORD, OF RACINE, WISCONSIN, ASSIGNOR TO J. I. CASE THRESHING MACHINE COMPANY, OF RACINE, WISCONSIN, A CORPORATION OF WISCONSIN.

MACHINE FOR MAKING RINGS.

1,390,507.  Specification of Letters Patent.  Patented Sept. 13, 1921.

Application filed February 20, 1919. Serial No. 278,269.

*To all whom it may concern:*

Be it known that I, JOHN F. CRAWFORD, a citizen of the United States, residing at Racine, in the county of Racine and State of Wisconsin, have invented certain new and useful Improvements in Machines for Making Rings, of which the following is a specification.

My invention relates to an improved machine for and method of producing rings or wheels from bar metal, which consists in taking preferably a single rectangular metal slab or bar and by various successive steps developing the same into perfect ring formation, which is readily accomplished, and whereby I am enabled to produce a heavy ring blank for milling into gear wheels or other machine parts in a very simple manner, and consequently at a material saving in time and expense.

In the accompanying drawings, which are made a part hereof, I have illustrated a press as a convenient means for producing the ring, but as will be understood, other appropriate means may be employed to produce similar results in the various stages of formation of such ring.

Figure 1:
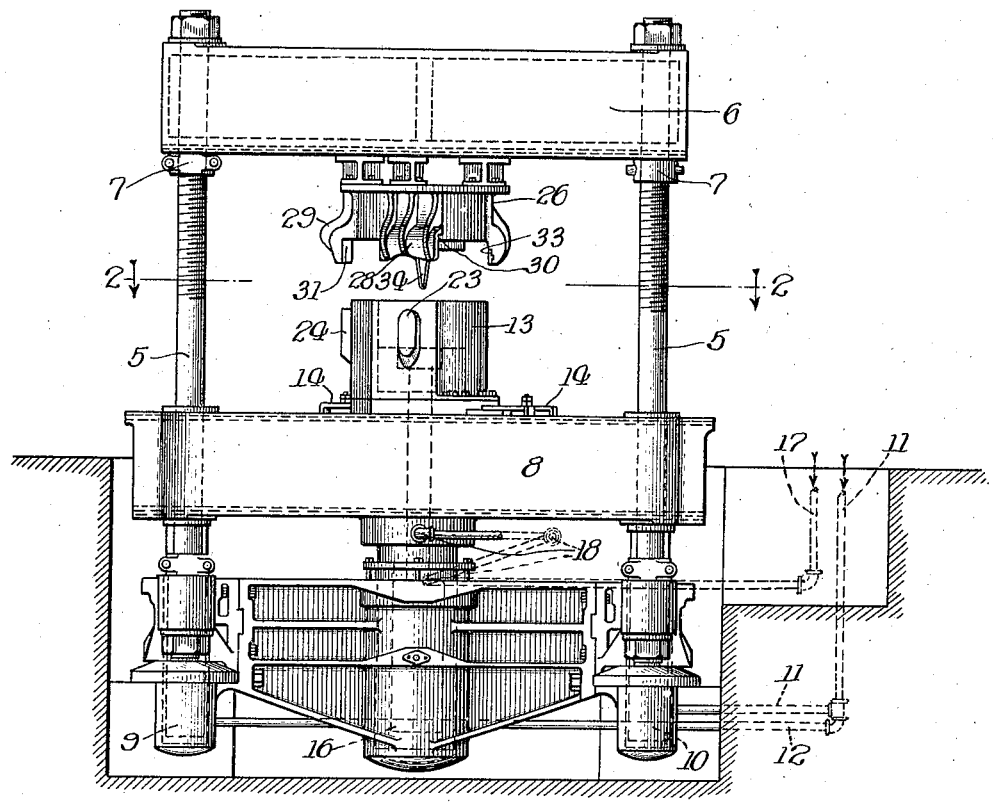
Figure 2:
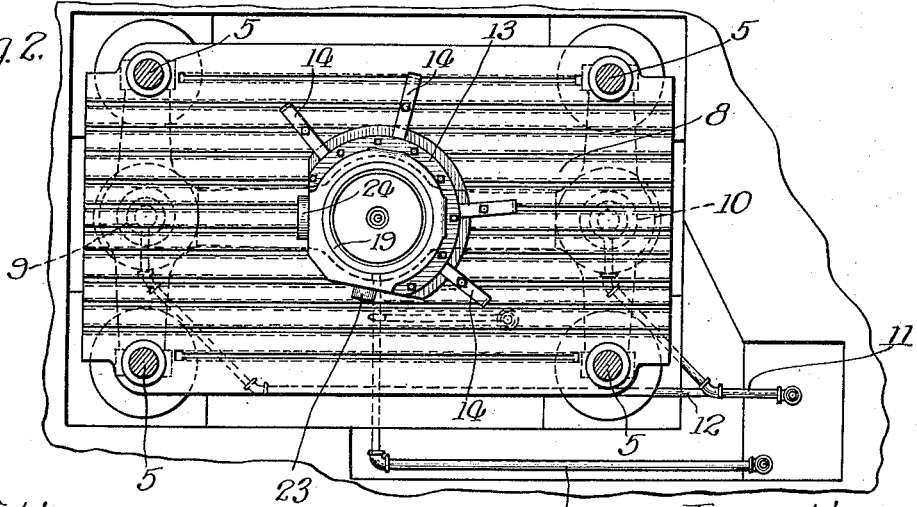

In the drawings, Figure 1 is a side elevation of a hydraulic press showing upper and lower dies in place and the the cylinders which form a part of such structure; Fig. 2 is a plan on the dotted line 2—2 of Fig. 1; Fig. 3 a section through the upper and lower dies showing the same in position for wedging; Fig. 4 is a plan of the lower die showing the stock or iron bar to be formed into a ring after having been wedged, said view being taken on the dotted line 4—4 in Fig. 3; Fig. 5 a bottom plan of the upper die taken on the dotted line 5—5 in Fig. 3; Fig. 6 a view showing the block on which the stock is placed after being wedged and removed from the die, as indicated in Fig. 4, said figure also including fragments of the upper and lower die parts; Fig. 7 shows the stock when spread apart by the upward pressure of the lower die against the upper die; Fig. 8 a section taken on the dotted line 8—8 in Fig. 7; Fig. 9 illustrates the next operation of rounding the ends of the stock to a small radius by the action of the lower die against the upper die; Fig. 10 the succeeding operation after the stock has been placed on a former of greater radius by which the action of the meeting dies give a portion of the ring a greater curve; Fig. 11 shows the dies in contact during the last step of forming said ring; Fig. 12 is a fragmentary sectional view of the die parts shown when in meeting position; and Figs. 13 to 22 inclusive indicate the various steps and shapes of the metal from the beginning to conclusion of its formation.

The press comprises in general a well known construction embodying columns, 5, upon which is mounted a head, 6, which may be adjusted upon said columns by suitable collars, 7, indicated in Fig. 1. A table, 8, is also mounted upon said columns 5, normally positioned approximately at the floor line of a building, which is adjusted upwardly and downwardly along said columns 5 by means of pressure controlled plungers, 9, 10, which are actuated by compressed fluid conveyed from a suitable source (not shown) through pipes, 11, 12.

Upon table 8 I mount a die, 13, which is secured thereto by clamps, as 14, and within said die is a plunger, 15, adapted to reciprocate therethrough by a plunger, 16, which receives its fluid pressure through pipe, 17, said pipe 17 being sectioned and connected by ball joints, as at 18, to permit table 8 to travel upon columns 5. In said die 13 I provide a hardened ring, 19, and in said plunger a socket, 20, for the reception of a wedge, for purposes to hereinafter appear. Upon the outer wall of die 13 I place a plurality of formers, 23, 24, Figs. 9, 10, which coöperate with die, 26, mounted in the head 6, for performing operations to be described.

In head 6 the die 26 (Fig. 3) is secured by clamps, 27, bolted thereto, or otherwise, and is provided with a plurality of forming members, 28, 29, having curved contact faces as 30, 31, to approximately conform to the contour of the formers 23, 24, carried by die 13, and is provided upon its inner peripheral face with a guide, 33, of hardened material to receive the ascending die 13 when the machine is in operation. I also provide in said die a wedge, 34, which is bolted or otherwise secured thereto as indicated in Fig. 3.

While I have specifically described my improved machine for forming rings from stock or bar material, it will be understood that other expediencies may be employed for producing the same results, and I have, therefore, illustrated and described said machine as a means for accomplishing my purpose, and in employing the same I am enabled to readily form rings of the character hereinbefore referred to in an expeditious manner and at greatly reduced cost, for it will be understood that the utilization of such rings for gear wheels in high power farm vehicles and other structures must be of considerable weight, those contemplated herein ranging in weight from one hundred and ninety to two hundred and forty pounds, and consequently, when produced in a manner commonly practised, involve considerable expense in manufacture, which expense, as stated, I materially minimize by carrying out the following operations.

Figure 13:
Figure 14:
Figure 15:
Figure 16:
Figure 17:
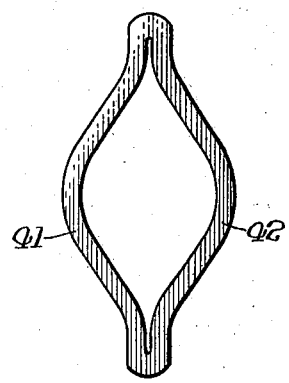
Figure 18:
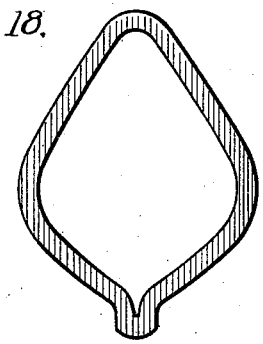
Figure 19:
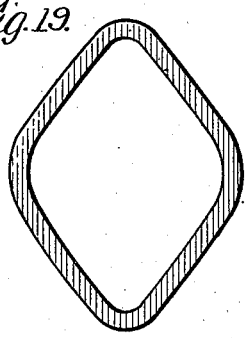
Figure 20:
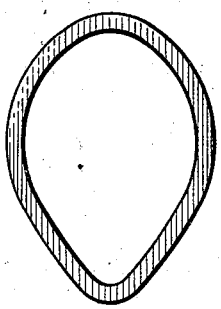
Figure 21:
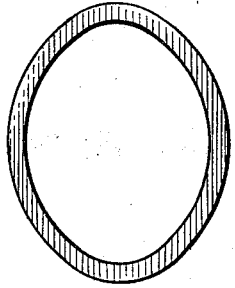
Figure 22:
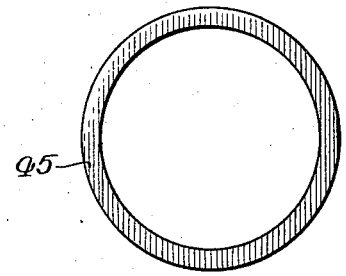

I take an ordinary bar of commerce, 36, of suitable length and thickness, and round the ends thereof in the manner indicated in Fig. 13, and drill a hole, 37, therethrough (Fig. 14) for the insertion of a suitable instrumentality for sawing a kerf, 38, longitudinally through the same (Fig. 15), such as the oxyacetylene torch or otherwise. I then operate the plunger 15 to bring the face thereof flush with the upper surface of die 13 so as to form a smooth surface for the reception of said bar 36, which has been previously heated to the required degree, and which I then place thereon. Table 8, carrying die 13, is then operated to ascend by means of fluid pressure through pipes 11, 12, the plunger 15 also traveling therewith by pressure through pipe 17, so that said die and plunger carry bar 36 into contact with wedge 34, which enters the slot or kerf 38 of bar 36, and, as said die and plunger continue ascending, said wedge is forced through said bar and spreads the sides thereof apart as indicated in Figs. 4, 6, and 16. Upon the outside of die 13 I place a forming block, 40, either fixedly secured thereto or resting upon table 8, and after said bar 36 has been wedged in the maner indicated and as shown in said Fig. 6, the same is placed in standing position upon said block 40, in the meantime table 8 and the parts carried thereby having been withdrawn from proximity to die 26. At this stage in the process table 8 and die 13 are caused to ascend so that the upper end of bar 36 is brought against one of the forming members, as 28, and as table 8 travels upwardly to its limit of movement the pressure between block 40 and forming member 28 causes said bar to be further divided, so that its members 41, 42, undergo a further spreading effect as indicated in Figs. 7 and 17. When this operation has been accomplished the widened material is transferred to a former 23 (Fig. 9) and is caused to ascend against forming member 28, which operation results in the formation of the bar into the shape indicated in Figs. 18 and 19, respectively, it being understood, of course, that the same has been turned from end to end by attendants so that both ends will undergo the same operation. The material is then transferred to a former 24 having a curvature of wider radius (Fig. 10), and the pressing or dieing operations repeated in the manner heretofore described, with the result that it is caused to assume the shape indicated in Figs. 10 and 20, but when turned from end to end and undergoing pressure the form becomes that shown in Fig. 21. The material after these operations being still heated to a high degree, is of sufficient pliability to be further straightened or formed, and I then place the same in a final shaping instrumentality, such for instance as die 13 and plunger 15, by which it is brought into contact with die 26 and under pressure is shaped into true circular form, 45, as indicated in Fig. 22. As a convenient means for handling the complete ring when said die and plunger have been withdrawn from die 26 I may, by the fluid pressure indicated, advance said plunger 15 to the position indicated in Fig. 3, by which movement said ring 45 is forced upwardly to lie freely upon the surface provided by said plunger and die 13, from whence it may be removed in any suitable manner.

In this simple manner, as will be readily understood, I am enabled to produce a heavy ring from bar material by employing different formative steps to spread and shape the same by variable pressure operations, with the result of a perfect ring as indicated in Fig. 22, which production is ecomically attained and by which I am enabled to obtain from commercial bar material stock rings serviceable for gear wheels and other purposes in a variety of mechanical requirements.

I claim as my invention:

1. A press comprising a head, a table movable in the direction of said head, a die mounted upon said table, a forming block on said die, a die carried by said head comprising a forming member registering with said forming block, and means for actuating said table and its die to bring material in contact with said forming member to press and shape the same.

2. A press comprising a head, a table movable in the direction of said head, a die mounted upon said table, a forming block in said die, a die carried by said head comprising a forming member registering with said forming block, means for actuating said table and its die to bring material in contact with said forming member to press and shape the same, and a plunger in said table die for coöperating therewith in the formation and removal of material.

3. A press comprising a head, a table movable in the direction of said head, a die mounted upon said table, a plunger in said die and having a socket therein, means for actuating said plunger to position the upper surface thereof in the horizontal plane of said die, an upper die having a wedge therein, and means for actuating said table die to contact with said upper die and to permit the projection of said wedge into said socket.

4. In a press, a stationary die, a forming member thereon, a movable die adapted to contact with said stationary die, a wedge in said stationary die, and means for projecting said movable die toward said stationary die to cause said wedge to spread material carried by said movable die.

5. In a press, a movable table, a die carried thereby, a bearing block associated with said die, a stationary die above said table and having a forming member therein, and means for actuating said table toward said stationary die to press and form material therebetween and said bearing block.

6. In a press, a stationary die, a, guide comprising hardened material within said die, a wedge carried by said die, a movable die beneath said stationary die and having a plunger therein, means for actuating said movable die to contact with said stationary die and to be positioned within the guide therein, and means for actuating said plunger to register with the surface of said movable die for supporting material to be operated upon by said wedge.

In testimony whereof I affix my signature.

JOHN F. CRAWFORD.